(12) United States Patent
Johansson et al.

(10) Patent No.: US 8,438,018 B2
(45) Date of Patent: May 7, 2013

(54) METHOD AND ARRANGEMENT FOR SPEECH CODING IN WIRELESS COMMUNICATION SYSTEMS

(75) Inventors: Ingemar Johansson, Luleå (SE); Jonas Svedberg, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1075 days.

(21) Appl. No.: 12/278,529

(22) PCT Filed: Feb. 6, 2006

(86) PCT No.: PCT/SE2006/000166
§ 371 (c)(1),
(2), (4) Date: Aug. 6, 2008

(87) PCT Pub. No.: WO2007/091926
PCT Pub. Date: Aug. 16, 2007

(65) Prior Publication Data
US 2009/0177465 A1    Jul. 9, 2009

(51) Int. Cl.
*G10L 19/00*    (2006.01)

(52) U.S. Cl.
USPC ............ 704/220; 704/201; 704/219; 714/746

(58) Field of Classification Search ................ 704/219, 704/201; 714/746
See application file for complete search history.

(56) References Cited

U.S. PATENT DOCUMENTS

| | | | |
|---|---|---|---|
| 7,092,880 B2 * | 8/2006 | Ivanic et al. .................. | 704/231 |
| 2004/0073692 A1 * | 4/2004 | Gentle et al. .................. | 709/231 |
| 2006/0188025 A1 * | 8/2006 | Hannuksela ............. | 375/240.27 |

OTHER PUBLICATIONS

Lara-Barron et al, "Missing Packet Recovery of Low-Bit_Rte Coded Speech uUsing a Novel Packet-Based Embedded Coder" Signal processing Theories and Applications., vol. 2 Conf. 5, Sep. 18, 1990 pp. 1115-1118.*

* cited by examiner

*Primary Examiner* — Vincent P Harper

(57) ABSTRACT

The present invention relates to speech coding in wireless and wireline communication systems. The present invention provides a method of saving bandwidth by a controlled dropping of speech frames at an encoder in a sending communication device. The dropping is controlled in a manner to minimize the effects on the speech quality after the decoding in the receiving communication device, by assuring that the state mismatch between the encoder and the decoder is removed or at least significantly reduced. This is achieved by letting the encoder run an ECU algorithm with a similar behavior as the one running in the decoder in the receiving communication device.

20 Claims, 5 Drawing Sheets

METHOD AND ARRANGEMENT FOR SPEECH CODING IN WIRELESS COMMUNICATION SYSTEMS

FIELD OF INVENTION

The present invention relates to speech coding in wireless and wireline communication systems. In particular, the present invention relates to variable speech coding rate, wherein the rate is varied to optimize the use of the transmission capacities in the radio interface.

BACKGROUND OF THE INVENTION

The interest in providing real time speech, or voice, applications in packet-switched communication systems is large and increasing. One of the main striving forces being the more efficient uses of the available transmission capacity offered by packet-switched technology as compared to circuit-switched technology. In a plurality of the today existing communication systems, which offer both data transmission and voice transmission, such as GSM and UMTS, voice is handled primarily by circuit-switched technology and data by packet switched technology. A further advantage of using packet-switched technology also for voice applications is the ability to use the same technology for all types of information transmission, and thus obtain a fully integrated system. A major part of the interest has concerned speech transmission over Internet, often referred to as Voice over IP (VoIP) or Internet Telephony. The interest encompass both the traditional fixed Internet and wireless solutions, for example based on GSM or UMTS. In the following, VoIP is used to exemplify packet-switched speech transmission and the term should be interpreted as including all types of speech transmissions using packet-switched technology.

Voice over IP is regulated in series of open standards, including H323, SIP (session initiation protocol), and RTP (real time transmission protocol) which are available for controlling voice calls that are transmitted using IP. The RTP standard has been set by IETF (International Engineering Task Force) and can be studied in RFC 3550. In a VoIP communication session, at the sending side, an incoming voice signal is sampled, quantized, and digitized in chunks of predetermined size, for example 20 ms, referred to as speech frames. The signal is then decoded with the use of a speech codec. A VoIP packet is formed comprising the voice parameters, an RTP header, an UDP (User Datagram Protocol) header and an IP header. The RTP header comprises a sequence number and a time stamp. The receiving side extracts the RTP packet from the UDP segment, then extracts the voice parameters from the RTP packet. A decoder reconstructs the speech which is presented to the user on the receiving side.

As previously mentioned, one of the objectives of VoIP services is the ability to adapt to the transmission capabilities of the link or system. One means to reduce the bit rate is to exploit variable rate coding. This is utilized in GSM and known as DTX (Discontinuous Transmission), wherein if a user is silent a lower bitrate can be used even omitting some background noise frames. However, even if the bit rate is low, the transmitted speech parameters must anyway be packed into an IP/UDP/RTP packet with some extra overhead. This overhead may be further reduced to 3 or 4 bytes using header compression techniques such as ROHC (robust header compression). Lower layers, such as the data link layer and the physical layer, of the IP stack cause additional packetization overhead. In all, although the average source bitrate can be greatly reduced with variable rate coding, the parameters that are produced will still need to be transmitted with extra packetization overhead, which is not related to the size of the payload to be transmitted. Hence, VR codecs (variable rate codecs) in VoIP applications often suffer the problem that the source bit rate reductions they can provide do not translate to corresponding gross transmission rate savings. This condition is recognised in the art, and some approaches have been reported to address the problem.

The IS-95/3GPP2 codecs TIA/IS-96 and TIA/IS-733 contains a feature called blank and burst which is applied such that, given external network control one can skip encoding of a given frame to provide room for control signaling frames. The encoder memory is set to a known state, when the decoder detects the blank frame the decoder memory is also set to the same known state.

Ref. [1] to Sannek et al. discloses a method to tag frames that are possible to cover with error concealment by the use of an ECU (error concealment unit). Frames that can be covered by ECU:s are assigned lower priority such that if congestion occur in a network the lower priority packets are dropped first. A similar approach is tested in ref. [2] to Lara-Barron, but for an embedded DPCM (differential pulse code modulation) codec, where a different encoding is used for lower priority frames compared to normal-priority frames.

The blank and burst feature in IS-96 and IS-733 [3] is controlled externally, which means that it may cause very audible artifacts.

The problem with Sannek's approach in ref [1] is that the encoder is unaware of the fact that a frame has been dropped. This leads to a state mismatch between encoder and decoder. Therefore one must be conservative with the use the frame drop in the network in order to not degrade the quality of the rendered speech too much.

The problem with Lara-Barrons approach in ref. [2] is that bandwidth is not saved and packet rate is only marginally reduced.

SUMMARY OF THE INVENTION

Obviously an improved method and arrangement, that makes it possible to fully take advantage of the possibilities of Voice over IP, as regards to flexibility in the transmission rate, is needed.

The object of the present invention is to provide a method and arrangement that overcome the drawbacks of the prior art techniques. This is achieved by the method as defined in claim 1, the encoding module as defined in claim 14.

In the method according to the present invention, a speech signal is encoded using a frame based analysis-by-synthesis speech codec. The encoding is characterized by an encoder state. A first communication device performing the encoding is in a speech communication session, or in the process of establishing a speech communication session, with at least a second communication device. The second communication device uses a frame based analysis-by-synthesis speech codec for decoding received speech data, said decoding is characterized by a decoder state. The decoder further uses an ECU algorithm to conceal lost speech frames in the decoding, and the ECU algorithm, then in use, affects the decoder state. In the method according to the invention a controlled dropping of speech frames is introduced in the encoder and an ECU algorithm is utilized in the encoding and arranged to, if a speech frame is deliberately dropped, affect the encoder state. Preferably, the behaviour of the ECU algorithm of the encoder is similar to the behaviour of the ECU algorithm of the decoder.

A preferred embodiment of the method according to the present invention comprises the steps of:

comparing the speech signal or a representation of the speech signal associated with a speech frame with the speech signal or a representation of the speech signal associated with at least one previous speech frame, determining if the speech frame should be dropped based on the result of the comparison, updating, if a speech frame is dropped, the encoder state according to the result of the ECU algorithm.

An encoding module for providing frame based analyses-by-synthesis speech coding according to the present invention comprises the following parts:

an encoder adapted to perform frame based analyses-by-synthesis speech coding of an incoming speech signal based upon its encoder state, a decision module adapted to compare a speech frame with a previous speech frame to determine if the speech frame can be deliberately dropped, and an ECU module in connection with the encoder and the decision module, and adapted to calculate at least one parameter affecting the encoder state, and provide that parameter to the encoder if the decision module has determined to drop a speech frame.

Thanks to the method and arrangement according to the invention it is possible to lower the transmission rate by dropping selected speech frames at the sending communication device, without causing unacceptable audible artefacts at the decoding in the receiving communication device.

One advantage of the present invention is that the speech frame dropping rate can be made dependent on external control parameters, such as quality measurements of the communication session, the traffic load of the communication system, for example if congestion occurs. Similarly a economy or budget mode can be offered, which permits a higher dropping rate than a high quality mode.

A further advantage is that the method according to the present can be used for a large variety of audio and video transmissions, including streamed media.

Embodiments of the invention are defined in the dependent claims. Other objects, advantages and novel features of the invention will become apparent from the following detailed description of the invention when considered in conjunction with the accompanying drawings and claims.

BRIEF DESCRIPTION OF THE DRAWINGS

The invention will now be described in detail with reference to the drawing figures, wherein FIG. 1 schematically illustrates a speech communication between a sending and receiving communication device.

DETAILED DESCRIPTION OF THE INVENTION

Figure 1:
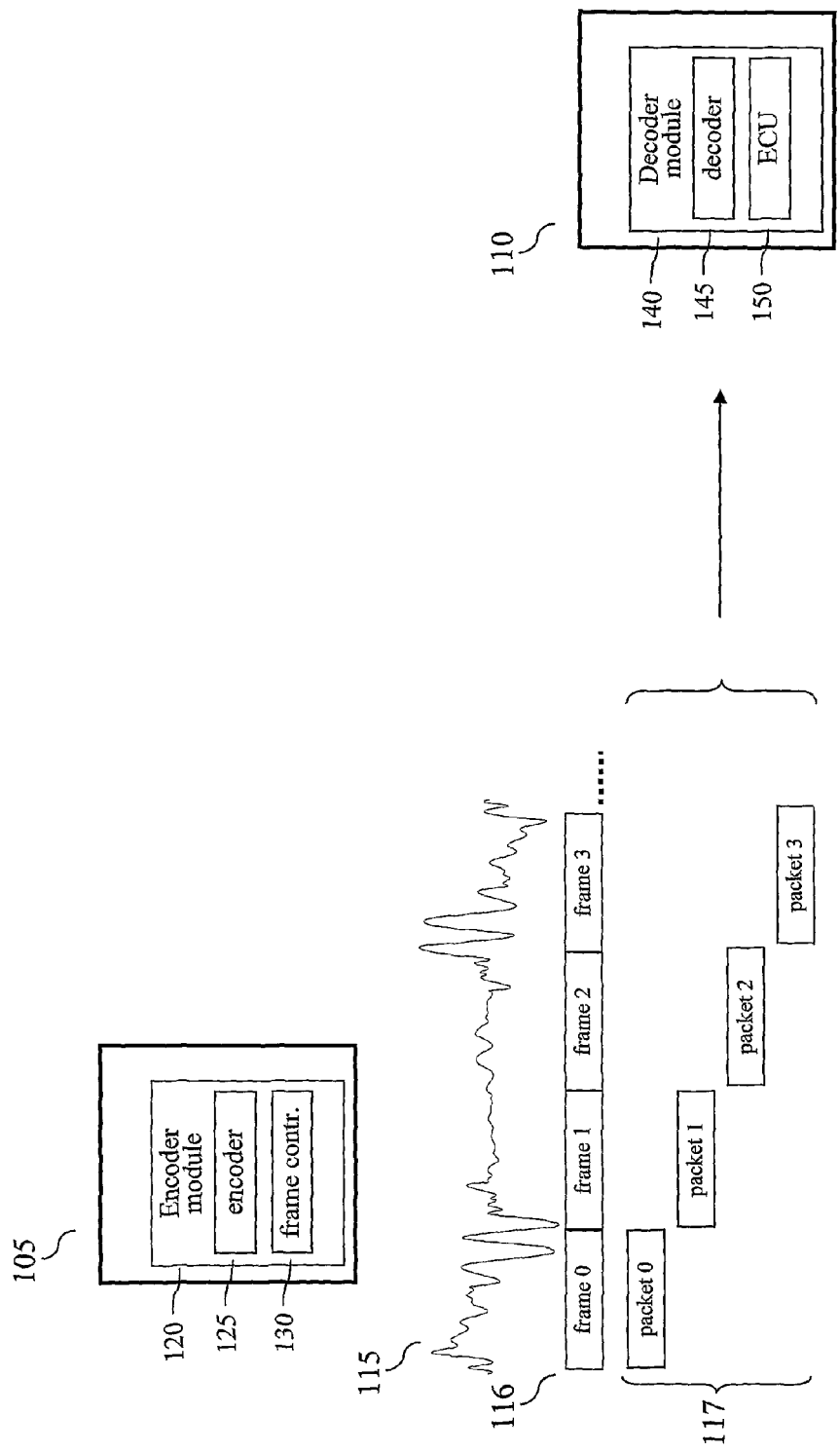

A typical scenario wherein the present invention may be utilized is illustrated in FIG. 1. Two communication devices are engaged in a communicating session. The sending device 105 is provided with an incoming speech signal 115 which is sampled, quantized, digitized, in chunks of predetermined size, for example 20 ms, referred to as speech frames 116. By the encoding and further packeting to comply to the transmission protocols used, voice data packets 117 are formed and transmitted to the receiving device 110. During the session the role of sending/receiving are typically shifting and the two devices are provided with means for both receiving and sending voice data packets. The receiving and sending devices 105, 110 are provided with an encoding module 120 and a decoding module 140 to process the speech signal and reconstruct the speech signal, respectively. The encoding module 120 and decoding module 140 comprises corresponding speech codecs acting as encoder 125 and decoder 145, respectively. The decoding module 140 comprises an ECU-algorithm to conceal lost voice data packets. Suitable speech codecs and ECU-algorithms are known in the art as exemplified in the background section. The encoding module 120 comprises a frame rate controller 130, determining and controlling if a speech frame could be deliberately dropped, which will be further discussed below.

The communication devices 105, 110 may for example be mobile telephones, fixed lined telephones, dedicated IP-telephones or any other equipment capable of maintaining a data communication and provide audio input and output to and from a user, for example PCs, laptop computers and PDAs. In the case that at least one of the communication devices is a regular telephone adapted for circuit-switched speech communication, the functionalities of speech coding and signal processing resides within the communication network, not in the communication device (phone) itself. Hence, it should be understood that the signal processing means and speech codecs could physically be placed elsewhere in the system, and the term comprising in this case should be interpreted as functionalities that are used by the communication device.

The present invention is of particular interest in a scenario wherein at least part of the communication between the communication devices 105, 110 is wireless, since the need for controlling the amount of transmitted data is most apparent in the capacity limited wireless systems. Therefore, the invention will, as a non-limited example, be described assuming the two communication devices being mobile terminals and part of a wireless mobile communication system providing packet-switched data communication, for example GSM or UMTS.

The invention is particularly suitable for encoders/decoders of analysis-by-synthesis type. In common CELP codecs, such as AMR, the encoder 125 consist of a built in decoder that is used for the analysis-by-synthesis. With this method it is ensured that the encoder 125 and the decoder 145 has the same contents in the adaptive codebook, also the values of LSF, fixed codebook and gains are identical. This collection of adaptive codebook (ACB) contents, LSF, fixed codebook and gain values is hereafter referred to as encoder and decoder states.

If a speech frame loss occurs (i.e the loss of coder parameters corresponding to a frame if decoded speech), the encoder according to prior art method, is not aware of this, mainly due to transmission delay. In the decoder the lost frame is covered by error concealment by the use of an ECU (Error Concealment Unit) that strives to make the packet loss as smooth as possible. The ECU output is generated by an ECU algorithm, which are known in the art and will be exemplified below. The lost packet is often covered quite well and is often not noticed, however, the main the main quality degradation occurs after the packet loss however.

As the ECU does not have the exact coder parameters to the decoder (they are after all lost) it performs some "guesswork" mainly by extrapolating the pitch lags, LSF and gain values. The ECU behavior is specified in the standards of the speech decoders, often as recommended implementation.

The effect of the lost packet is, due to lack of correct parameters, that the state in the encoder and the decoder does not match anymore, this problem is most prominent with the ACB. The mismatch will lead to an error propagation that may last as long as 5-6 frames after the packet loss, and which may cause clearly audible effects.

For a generic CELP Linear Predictive Codec, the actual ECU algorithm may be seen as a means for providing a speech synthesis for every sub frame as a function of five core compression parameters:

1. The synthesis filter coefficients.
2. The adaptive codebook (ACB) lag value.
3. The adaptive codebook gain value.
4. The innovation (e.g. random innovation with a specific zero crossing rate or a zero innovation signal).
5. The innovation gain (scale factor for the innovation vector).

These five compression parameters are normally locally estimated by the ECU algorithm in the decoder based on decoder states to provide a synthesis concealing a lost frame. An ECU algorithm typically comprises:

1. Reuse slightly modified synthesis filter coefficients from the previous frame.
2. Reuse the adaptive codebook lag value from the previous sub-frame.
3. Compute an average ACB gain value from the previous couple of subframes, attenuate it somewhat to provide a new ACB gain for the subframe.
4. Randomize the innovation signal.
5. If the ACB gain average values are higher than e.g. 0.7 the innovation gain is zeroed, else use a slightly attenuated value of the previous subframes innovation gains.

Figure 2:
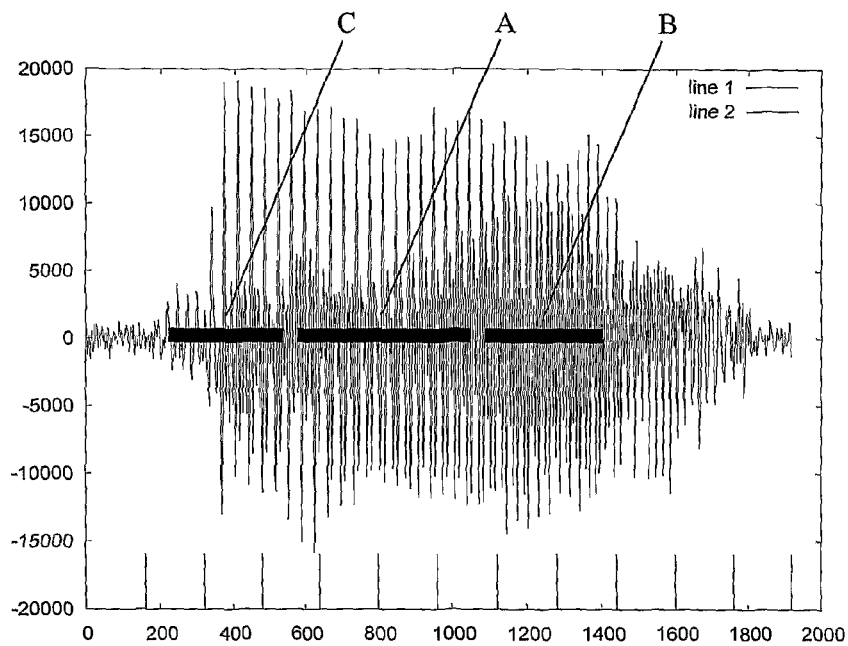
FIG. 2 illustrates in a graph stationary and non-stationary periods in a typical speech signal.

As illustrated in the graph of FIG. 2 consecutive speech frames are often quite similar at a timescale that is longer than a typical sampling period for a speech frame (20 ms). In the exemplary graph, periods A and B represents stationary conditions, whereas period C represent a non-stationary or onset conditions. In this example, if a speech frame in period A has been encoded by the encoder 125, consecutive speech frames in the same period could, if lost, probably be accurately handled by the ECU algorithm in the decoder, since the speech signal behaviour during the time period represented by these frames is essentially stationary. These frames could be referred to as stationary voiced. The same holds for consecutive speech frames within period B. Frames within period C needs to be received as the period C contains an onset of a significantly different behavior of the speech signal. Also speech frames containing no speech signal, stationary unvoiced frames, (not shown), are reasonable to assume that the decoder can replace. Given the performance of an effective ECU algorithm it occurs possible to deliberately drop consecutive speech frames that are similar, or unvoiced, and rely on the ECU algorithm in the decoder to reconstruct the speech without a disturbing loss of quality, and thereby save transmission capacity. However, as described above, such deliberate frame dropping would cause a propagating error in the following speech frames.

According to the present invention a possibility to save bandwidth is introduced by a controlled dropping of speech frames at the encoder 125 in the sending communication device 105. The dropping is controlled in a manner to minimize the effects on the speech quality after the decoding in the receiving communication device 110, by assuring that the state mismatch between the encoder 125 and the decoder 145 is removed or at least significantly reduced.

The error propagation problem is avoided by informing the encoder 125 in the sending communication device 105 that a frame is deliberately dropped and letting the encoder 125 run an ECU algorithm with a similar behavior as the one running in the decoder 145 in the receiving communication device 110. This will result in that the state in the encoder 125 is the same as the state in the decoder 145. In the encoding of the next frame the search in the adaptive codebook will be based on the same contents that exist in the decoder. Therefore no error propagation will occur. The contents in the adaptive codebook on the encoder side is affected by the output of the ECU algorithm but this is not critical as the codebook search for the next frame is done on a best match basis to be additionally improved by the fixed codebook search. The ECU algorithm of the encoder 125 is preferably identical to the decoder ECU algorithm, but also an encoder ECU algorithm producing an output with a slight deviation to that of the decoder ECU algorithm could enhance the encoding-decoding procedure.

Figure 3:
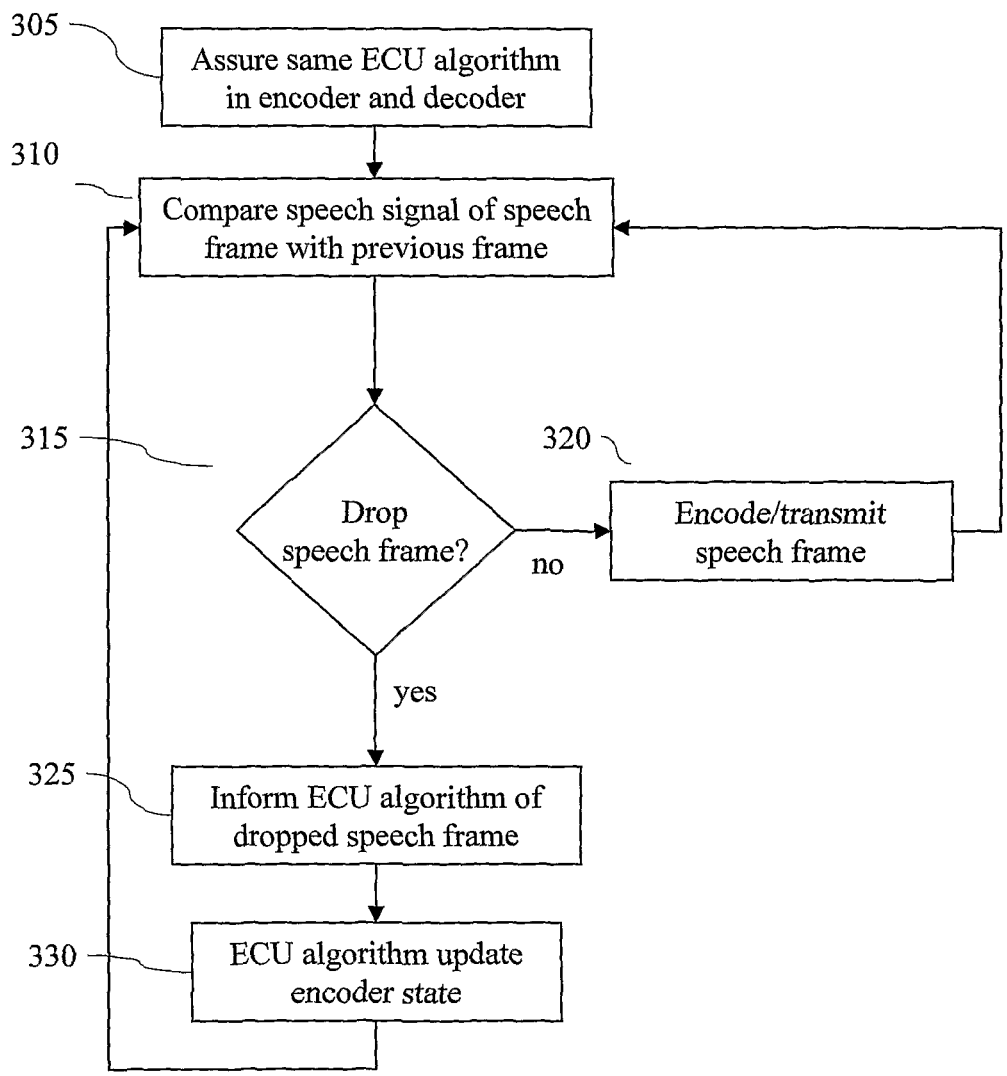
FIG. 3 is a flowchart over the method according to the present invention.

The method according to the invention is illustrated in the flowchart of FIG. 3 and comprises an initial step, typically taken at communication setup, of:

305: Assuring that the encoder module 125 and the decoder module 145 uses the same or similar ECU algorithm and if applicable, using the same configuration parameters.

During operation, i.e. the transfer of coded speech frames from the sending 105 to the receiving 110 communication device, the method comprises the steps of:

310: Comparing the speech signal or a representation of the speech signal associated with a speech frame with the speech signal or a representation of the speech signal associated with at least one previous speech frame.

315: Determining if the speech frame should be dropped based on the result of the comparison and on the current requirement of reducing the transmission rate.

320: If the speech frame should not be dropped the encoding proceeds as normal and a corresponding voice data packet is transmitted to the receiving communication device 110. The method returns to step 310.

325: If a deliberate drop of the speech frame is determined, the encoder 125 is informed of the removal of the speech frame.

330: The encoder state is updated according to the result of the ECU algorithm of the encoder module 125. The method returns to step 310.

The steps 310-330 is typically repeated for each speech frame.

Depending on different implementations, representing different embodiments of the invention, the steps of informing the ECU-algorithm (320) and determining updated encoder state (325) may be performed in combination with the comparing step 310. In which case the updated of the encoder state, that is suggested by the ECU algorithm, is only effectuated if it is determined to drop the speech frame.

Figure 4:
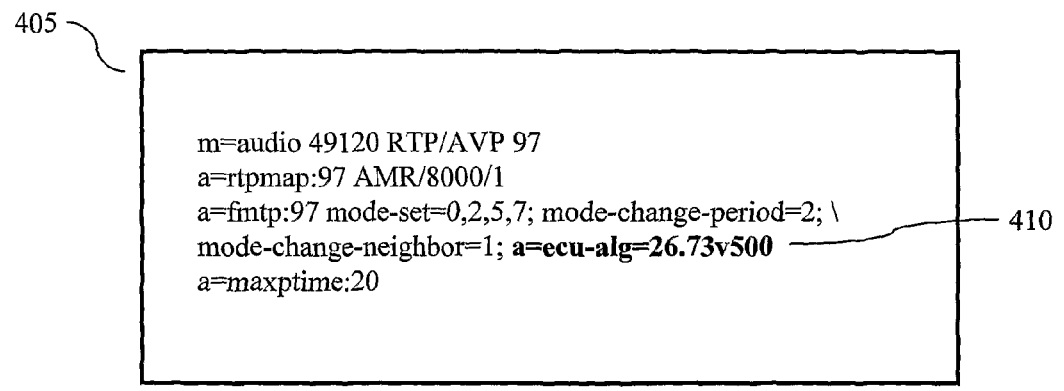
FIG. 4 schematically illustrates an example of a message transmitted at a communication setup to communicate ECU-parameters.

The step of assuring that the same ECU algorithm is used in both the sending and receiving device, step 305, may utilize proprietary (tuned) implementations of the ECU algorithms, to make sure that the frame dropping strategy will work out as planned. The desired ECU-prediction functionality may be signaled at the setup of the communication session/media stream. E.g. an additional SDP parameter may be used during SIP call-setup to ensure that the correct ECU algorithm (ecu-alg) will be used throughout the session. An example of a SDP message 405 to be exchanged during communication setup is illustrated in FIG. 4, wherein a ECU entry 410 the ECU algorithm and/or its parameters. "26.073v500" in this example points to a specific ECU version implemented in fixed point C-code.

The process of determining if a speech frame could be dropped with acceptable loss of quality, steps 310 and 315, may be performed in a number of different ways The process of determining if a speech frame can be dropped can according to the invention be made to be controlled or influenced by external factors. i.e. factors not arising from the analysis of the speech signal itself. External controlled can be introduced by letting the determination of step 315 be based also on external control parameters. The external control parameters include, but is not limited to quality measurements, for example SNR, on the communication link, traffic load in the communication system, and transmission rate requirements for the specific communication session.

In one embodiment of the method the deliberate speech frame dropping mechanism is activated only if there is a requirement for lowering the transmission rate, for example as a result of a detection of congestion in the communication system. The speech frame dropping can be controlled by external conditions in more elaborated ways. For example a certain load in the system requiring a certain speech frame dropping rate. Alternatively, or additionally, the activation of the frame dropping mechanism is controlled by the communication system as a budget or economy mode of operation. Another application of speech frame dropping is in a variable rate codec wherein the option to drop frames is then regarded as an additional coding mode.

The decision to drop frames can be done either in a closed loop or open loop approach or in a combination of the two.

Figure 5A:
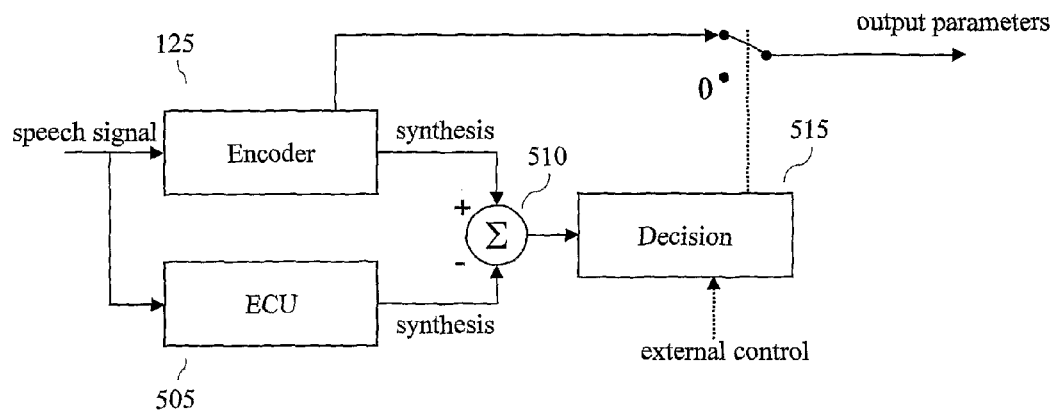
FIGS. 5a and b schematically illustrates the decision process in a closed loop (a) and open loop (b) arrangement.

In a closed loop arrangement, schematically illustrated in FIG. 5a, the input signal is provided to the encoder 125 which produces output parameters and local encoder synthesis in a normal encoding operation. An ECU-algorithm 505, also provided with the input speech signal, produces alternative encoder synthesis which is compared to the local encoder synthesis in a comparator 510. These procedure correspond to step 310 in the flowchart of FIG. 3. A decision algorithm 515 determines if the difference is below a threshold value, i.e. the frame can be dropped at the encoder with very little audible degradation, corresponding to step 315. The threshold can be adjusted such that a given percentage of the active speech frames are dropped. External control, for example SNR measurements can be taken into account in the decision algorithm, for example affecting the threshold value.

Figure 5B:
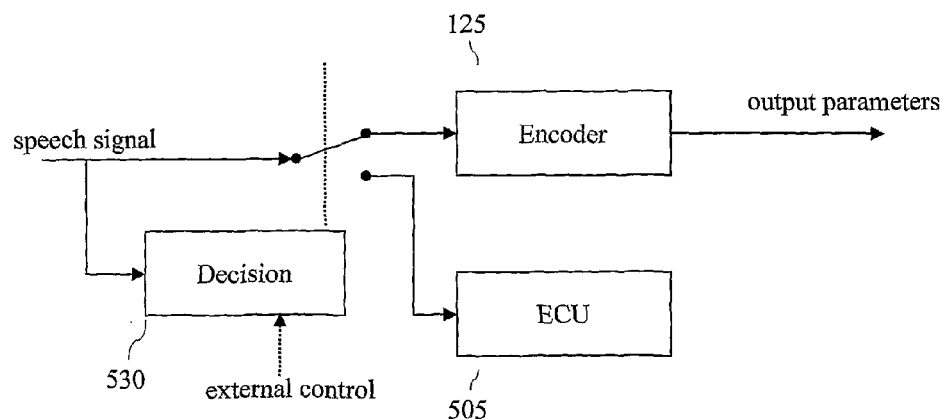

In an open loop arrangement, schematically illustrated in FIG. 5b, the input signal is provided to a decision algorithm or frame classifier 530, which determines if a speech frame could be dropped prior to engaging the encoder 120 (not dropped) or the ECU-algorithm (dropped), which corresponds to steps 310-315. Stationary Voiced and stationary unvoiced frames after the initial stationary frame are likely to be possible to drop with little degradation as they can be covered well with the ECU-synthesis. Onset or transient frames should not be dropped as they are not well handled by the ECU. And also the first stationary frames should preferably not be dropped as they will provide the basis for the decoders ECU extrapolation. Similar to in the closed loop arrangement the frame classifier 530 can be arranged to take external factors such as quality measurements into account.

An example solution is:

Open loop and closed loop arrangements may be combined in various ways. For example, an open loop decision is made according to the above is made if the frame is found to be stationary voiced, a closed loop test according to the above is performed, if the frame found to be something else then Open loop decision is used.

From the description above it can be seen that, given that one can run the same ECU in the encoder as is implemented in the decoder, it is possible to drop frames already on the encoder side with a modest drop in perceived quality. As no bits need to be transmitted for the dropped frames, the gain in decreased average bit-rate is immediate. If for instance one assumes a VAF of 50% and that 20% of the active speech frames can be dropped with this method the average bit-rate is decreased by up to 10%. This can be seen as adding an extra zero bit-rate mode to an existing coding standard.

Figure 6:
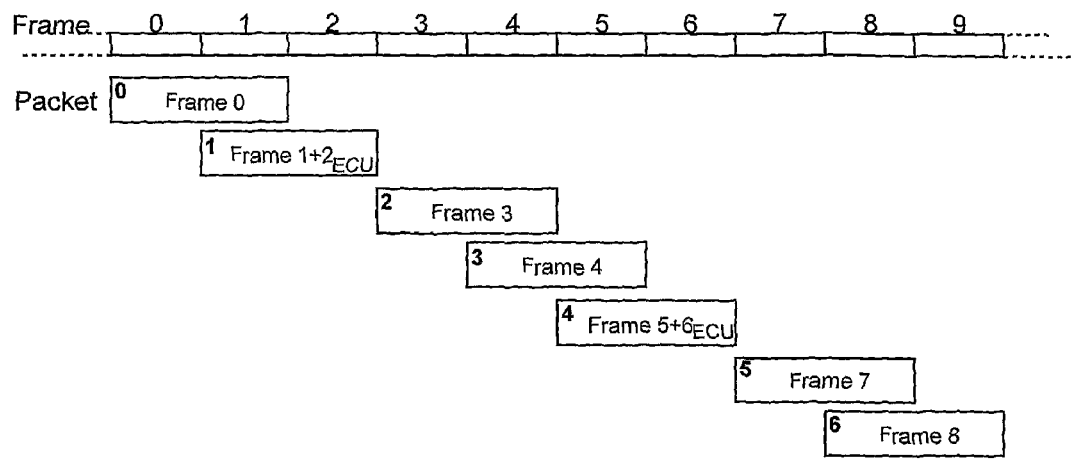
FIG. 6 schematically illustrates the structure of transmitted voice data packets utilizing a method according to one embodiment of the present invention.

The performance of the encoding/decoding may be further enhanced if extra side information is provided to the decoder of the receiving communication device. One way to improve the ECU decoding is to delay the encoding by at least one frame. Possible such side information is e.g. pitch lag and pitch gain. In this case the ECU is applied to all parameters except those that are sent as extra side information. The synthesis will be delayed and the side information parameters are used for synthesis for the dropped frame. Illustrated in FIG. 6 is a scenario wherein a number of speech frames [0 . . . 9] are encoded and packets are produced. The frame drop determination algorithm decides that frame 2 is to be dropped, this frame is either ECU'ed completely or a computation of extra side information to improve the ECU performance. Included in packet 1 is the extra side information relating to the dropped frame 2. The same occurs for frame 6 in the example above, hence packet 4 will include extra side information relating to frame 6.

Alternatively the side information can be tagged on to the next packet and the additional delay will need to be controlled by the receiving side. In this case, given the above example of dropping frames 2 and 6, the packet 2 will include parameters for frame 3 and extra side information relating to frame 2, and packet 5 will include parameters for frame 7 and extra side information relating to frame 6. An adaptive receiver de-jitter buffer controlled by a target quality setting, will to some extent automatically increase its buffering depth when erasures (frame errors) are present.

Example of extra side information include, but is not limited to the ACB lag parameter, which can be sent as 7 bit integer value in the range [16 to 143] value for improving ECU-synthesis in the next frame. Alternatively or additionally the ACB gain parameter for the ECU'd frame can be sent as a 3 bit scalar quantized gain index with values [0.125, 0.25, 0.375, 0.5, 0.625, 0.75, 0.875, 0.99]. The ACB gain can be sent as one value for the whole frame or as one value for each of the subframes.

To achieve the good results which is possible thanks to the present invention, the encoder and decoder states should be as identical as possible. For a reliable result the decoding of the fixed codebook contribution for the dropped frame must be done in the same way as is done in the encoder when frame dropping is applied. In most cases the innovation codebook index is randomized. In the method according to the invention the random value is replaced with a deterministic value, which is known, or can be derived, in both sending and receiving communication devices. One alternative is to use received bits from the previous frame as a deterministic source, e.g. the LSBs of the previous frame LSP quantizer, or the LSBs of the previous frame gain quantizer can be used as seed bits for randomization of the codebook innovation.

Figure 7:
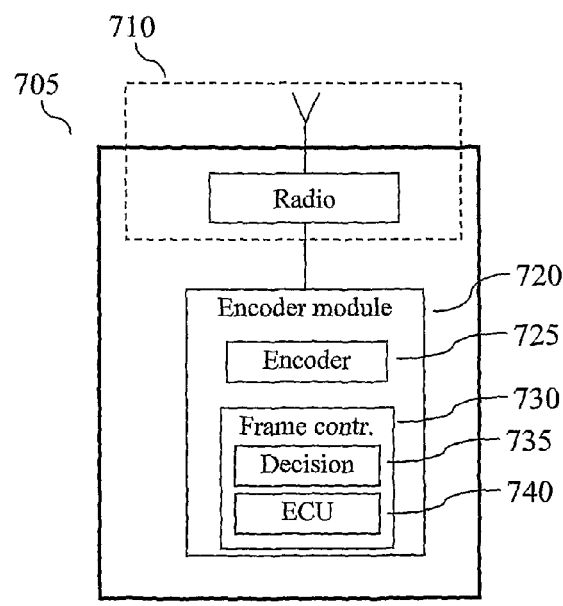
FIG. 7 schematically illustrates a sending communication device according to the present invention.

Arrangements according to the present invention in a sending communication device, suitable for effectuating the above described embodiments is schematically illustrated in FIG. 7.

The modules and blocks according to the present invention are to be regarded as functional parts of the communication device and not necessarily as physical objects by themselves. The modules and blocks are preferably at least partly implemented as software code means, to be adapted to effectuate the method according to the invention. The term "comprising" does primarily refer to a logical structure and the term "connected" should here be interpreted as links between functional parts and not necessarily physical connections. However, depending on the chosen implementation, certain modules may be realized as physically distinctive objects in a receiving or sending device.

The communication device 705 comprises communication means 710, for example radio communication means, which provides the necessary functionalities for performing the transfer of the data packets to the receiving device. The communication means 710 are adapted to the communication technique in question and is well known by the skilled person. The communication device 705 is provided with an encoder module 720 and connected to the communication means 710. The encoder module 720 is adapted to receive a speech signal and provide the communication means 710 with the speech parameters to be transferred in a data packet. According to the invention the communication device 705 is further provided with an encoder 725, for example a CELP codec, a decision module 735 and an ECU module 740. The decision module 735, the ECU module 740 and possibly further signal processing means forms a frame controller 730 adapted to determine if a speech frame could be dropped, according to the above described criteria, and to update the encoder state with the parameters determined by the ECU module 740. Preferably the decision module 735 is adapted to receive external control information, for example required level of drop rate.

The method and arrangements according to the present invention has been described with reference to voice applications. As appreciated by the skilled in the art the method and arrangements are applicable also to other similar types of transmissions wherein an incoming signal is sampled and divided into individual frames. This includes, but is not limited to, various types of audio and video transmissions, including so called streamed media. An incoming audio or video signal is analysed in the same manner as the speech signal to find extended periods of time wherein the signal is relatively stationary, for which corresponding frames could be omitted without significant loss of quality.

While the invention has been described in connection with what is presently considered to be the most practical and preferred embodiments, it is to be understood that the invention is not to be limited to the disclosed embodiments, on the contrary, is intended to cover various modifications and equivalent arrangements within the appended claims.

REFERENCES

1. H. Sanneck, N. Le, M. Haardt and W. Mohr "Selective Packet Prioritization for Wireless VoIP", in Fourth International Symposium on Wireless Personal Multimedia Communication, Aalborg, Denmark, September 2001
2. LARA-BARRON; LOCKHART: 'Missing packet recovery of low-bit-rate coded speech using a novel packet-based embedded coder' PROC. OF THE EUROPEAN SIGNAL PROCESSING CONFERENCE, SIGNAL PROCESSING THEORIES AND APPLICATIONS vol. 2, no. 5, 18 Sep. 1990-21 Sep. 1990, BARCELONA, pages 1115-11181.
3. TIA/EIA/IS-733 High Rate Speech Service Option 17 for Wideband Spread Spectrum Communication Systems (Q-CELP)

The invention claimed is:

1. A method of encoding a speech signal using a frame based analysis-by-synthesis speech codec, said encoding characterized by an encoder state, wherein a first communication device performing the encoding is in a speech communication session, or in the process of establishing a speech communication session, with at least a second communication device, the second communication device using a frame based analysis-by-synthesis speech codec for decoding received speech data, said decoding comprising a decoder state, wherein in the decoding an ECU algorithm is used to conceal lost speech frames in the decoding, and said ECU algorithm affecting the decoder state, wherein said method comprises:
  determining if a speech frame should be deliberately dropped, wherein the determining comprises
    providing the speech signal to the encoder that produces a local encoder synthesis in a normal encoding operation,
    providing the speech signal to an ECU algorithm that produces alternative encoder synthesis, and
    comparing a difference of the alternative encoder synthesis and the local encoder synthesis to a predetermined threshold; and
  if a speech frame is deliberately dropped, affecting the encoder state by using the ECU algorithm in the encoding.

2. The encoding method according to claim 1, wherein the behaviour of the ECU algorithm of the encoder is similar to the behaviour of the ECU algorithm of the decoder.

3. The encoding method according to claim 2, comprising an initial step, to be taken at communication setup, of assuring that the ECU algorithm of the encoder is identical with the ECU algorithm of the decoder by transferring from the first communication device to the second communication device a message comprising an identification of the ECU algorithm and/or an identification of configuration parameters.

4. The encoding method according to claim 3, further comprising the steps of:
  comparing the speech signal or a representation of the speech signal associated with a speech frame with the speech signal or a representation of the speech signal associated with at least one previous speech frame;
  determining if the speech frame should be dropped based on the result of the comparison;
  updating, if a speech frame is dropped, the encoder state according to the result of the ECU algorithm.

5. The encoding method according to claim 4, wherein the ECU algorithm is used in the comparing step by comparing the synthesis of the ECU algorithm with the synthesis of the encoder.

6. The encoding method according to claim 4, wherein the ECU algorithm is activated if it in the comparing step is determined that the speech frame could be dropped.

7. The encoding method according to claim 4, wherein in the step of determining if a speech frame could be dropped, the determination is further based on external control parameters.

8. The encoding method according to claim 7, wherein the external control parameters comprises current requirement of the transmission rate of the communication session.

9. The encoding method according to claim 7, wherein the external control parameters comprises quality measurements of the transmission conditions between the first and second communication device.

10. The encoding method according to claim 8, wherein the external control parameters comprises an indication of congestion in the communication system used by the first and second communication device.

11. The encoding method according to claim 4, wherein in the determining step a speech frame is dropped if the difference to a previous speech frame is below a threshold, and the external control parameters affects the threshold value.

12. The encoding method according to claim 4, wherein the ECU algorithm provides at least one of the following codec parameters affecting the encoder state: the synthesis filter coefficients, the adaptive codebook (ACB) lag value, the adaptive codebook gain value, the innovation or innovation gain.

13. The encoding method according to claim 12, wherein at least one of the codec parameters provided by the ECU algorithm or the encoding algorithm is transferred to the decoder of the second communication device as side information in at least one voice data packet.

14. A communication device for providing frame based analyses-by-synthesis speech coding, comprising
at least one processor;
a non-transitory computer readable storage medium including computer-readable instructions, when executed by the at least one processor, are configured to:
perform, in an encoder, frame based analyses-by-synthesis speech coding of an incoming speech signal based upon an encoder state;
produce a local encoder synthesis in a normal encoding operation;
produce, in an ECU module, an alternative encoder synthesis;
compare, in a decision module, a difference between the alternative encoder synthesis and the local encoder synthesis to a predetermined threshold; and
calculate, in an ECU module, at least one parameter affecting the encoder state, and provide that parameter to the encoder if the decision module has determined to drop a speech frame.

15. The communication device according to claim 14, wherein the computer-readable instructions, when executed by the at least one processor, are further configured to:
receive, in the decision module, external control parameters, said external control parameters to be used in determining if a speech frame can be deliberately dropped.

16. The communication device according to claim 15, wherein the external control parameters indicates requirement of the transmission rate of the communication session.

17. The communication device according to claim 15, wherein the external control parameters comprises quality measurements of a transmission capability relating to a communication session.

18. The communication device according to claim 15, wherein the external control parameters comprises an indication of congestion in a communication system.

19. The communication device according to claim 15, wherein the computer-readable instructions, when executed by the at least one processor, is further configured to:
drop, in the decision module, the speech frame if the difference to a previous speech frame is below a threshold, and wherein the external control parameters affects the threshold value.

20. The communication device according to claim 14, wherein the computer-readable instructions, when executed by the at least one processor, is further configured to:
provide, by the ECU module, at least one of the following codec parameters to the encoder affecting the encoder state: the synthesis filter coefficients, the adaptive codebook (ACB) lag value, the adaptive codebook gain value, the innovation or innovation gain.

* * * * *

UNITED STATES PATENT AND TRADEMARK OFFICE
CERTIFICATE OF CORRECTION

PATENT NO.          : 8,438,018 B2
APPLICATION NO.     : 12/278529
DATED               : May 7, 2013
INVENTOR(S)         : Johansson et al.

It is certified that error appears in the above-identified patent and that said Letters Patent is hereby corrected as shown below:

In the Specification

In Column 4, Line 10, delete "receiving and sending" and insert -- sending and receiving --, therefor.

In Column 6, Line 53, delete "(320)" and insert -- (325) --, therefor.

In Column 6, Line 54, delete "(325)" and insert -- (330) --, therefor.

In Column 7, Line 7, delete "ways" and insert -- ways. --, therefor.

In Column 7, Line 10, delete "factors." and insert -- factors, --, therefor.

In Column 7, Line 52, delete "encoder 120" and insert -- encoder 125 --, therefor.

In Column 8, Line 2, delete "Open" and insert -- open --, therefor.

In Column 9, Line 60, delete "2001" and insert -- 2001. --, therefor.

In Column 10, Line 3, delete "(Q-CELP)" and insert -- (Q-CELP). --, therefor.

In the Claims

In Column 11, Line 24, in Claim 14, delete "comprising" and insert -- comprising: --, therefor.

Signed and Sealed this
Fourth Day of November, 2014

Michelle K. Lee
*Deputy Director of the United States Patent and Trademark Office*